(12) United States Patent
Thompson

(10) Patent No.: US 6,663,124 B1
(45) Date of Patent: Dec. 16, 2003

(54) CO-AXIAL KINGPIN LOCK MECHANISM

(75) Inventor: David Thompson, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 8 days.

(21) Appl. No.: 10/162,508

(22) Filed: Jun. 4, 2002

(51) Int. Cl.$^7$ ................................................ B62D 7/18
(52) U.S. Cl. ................................................. 280/93.512
(58) Field of Search ..................................... 280/93.512

(56) References Cited

U.S. PATENT DOCUMENTS

| | | | | | |
|---|---|---|---|---|---|
| 677,136 | A | * | 6/1901 | Krastin | 280/93.512 |
| 1,356,984 | A | * | 10/1920 | Howell | 280/124.127 |
| 1,474,057 | A | * | 11/1923 | Pridemore | 280/93.512 |
| 1,568,782 | A | * | 1/1926 | Swayne | 280/93.512 |
| 1,642,640 | A | * | 9/1927 | Bouch et al | 280/93.512 |
| 1,891,459 | A | * | 12/1932 | Thomas | 280/93.512 |
| 1,894,658 | A | * | 1/1933 | Bijur | 280/93.512 |
| 1,974,415 | A | * | 9/1934 | Bijur | 280/93.512 |
| 2,009,429 | A | * | 7/1935 | Bijur | 280/93.512 |
| 2,027,366 | A | * | 1/1936 | Bijur | 280/93.512 |
| 2,039,912 | A | * | 5/1936 | Leighton | 280/93.512 |
| 2,057,372 | A | | 10/1936 | Douglas et al. | 280/93.512 |
| 2,070,289 | A | * | 2/1937 | Marmon et al. | 280/93.512 |
| 2,208,189 | A | * | 7/1940 | Jones | 280/93.512 |
| 2,385,170 | A | * | 9/1945 | Tedd | 280/93.512 |
| 2,421,007 | A | * | 5/1947 | Buckendale | 280/93.512 |
| 2,428,651 | A | * | 10/1947 | Buese | 280/93.512 |
| 2,713,497 | A | * | 7/1955 | Bretschneider | 280/93.512 |
| 3,225,855 | A | * | 12/1965 | Sherwen | 280/93.512 |
| 3,477,771 | A | * | 11/1969 | Herbenar | 280/93.512 |
| 3,659,869 | A | * | 5/1972 | Hase et al. | 280/93.512 |
| 3,915,469 | A | * | 10/1975 | Vanice | 280/93.512 |
| 4,043,567 | A | * | 8/1977 | Kaiser | 280/93.512 |
| 4,229,017 | A | * | 10/1980 | Hagedorn | 280/93.512 |
| 4,690,418 | A | * | 9/1987 | Smith | 280/93.512 |
| 4,798,394 | A | * | 1/1989 | Pollock et al. | 280/93.512 |
| 4,915,530 | A | * | 4/1990 | Tomlinson | 280/93.512 |
| 5,709,399 | A | | 1/1998 | Smith, Jr. | 280/93.512 |
| 5,722,784 | A | * | 3/1998 | Link | 280/93.512 |

FOREIGN PATENT DOCUMENTS

| | | | |
|---|---|---|---|
| GB | 2229409 B1 | * | 9/1990 |
| WO | WO-02/102642 B1 | * | 12/2002 |

* cited by examiner

*Primary Examiner*—Darren W. Ark
(74) *Attorney, Agent, or Firm*—Dykema Gossett PLLC

(57) ABSTRACT

A steer axle kingpin assembly is provided that eliminates the need for draw keys. The assembly includes A kingpin body that is received within a kingpin bore of a steer axle and extends along a longitudinal axis. The body includes an axially extending bore and a radially extending bore in communication with the axially extending bore. Ball bearings are disposed within the radially extending bore. A lock pin is inserted into the axially extending bore and urges the ball bearings outward into engagement with the kingpin bore of the steer axle.

20 Claims, 1 Drawing Sheet

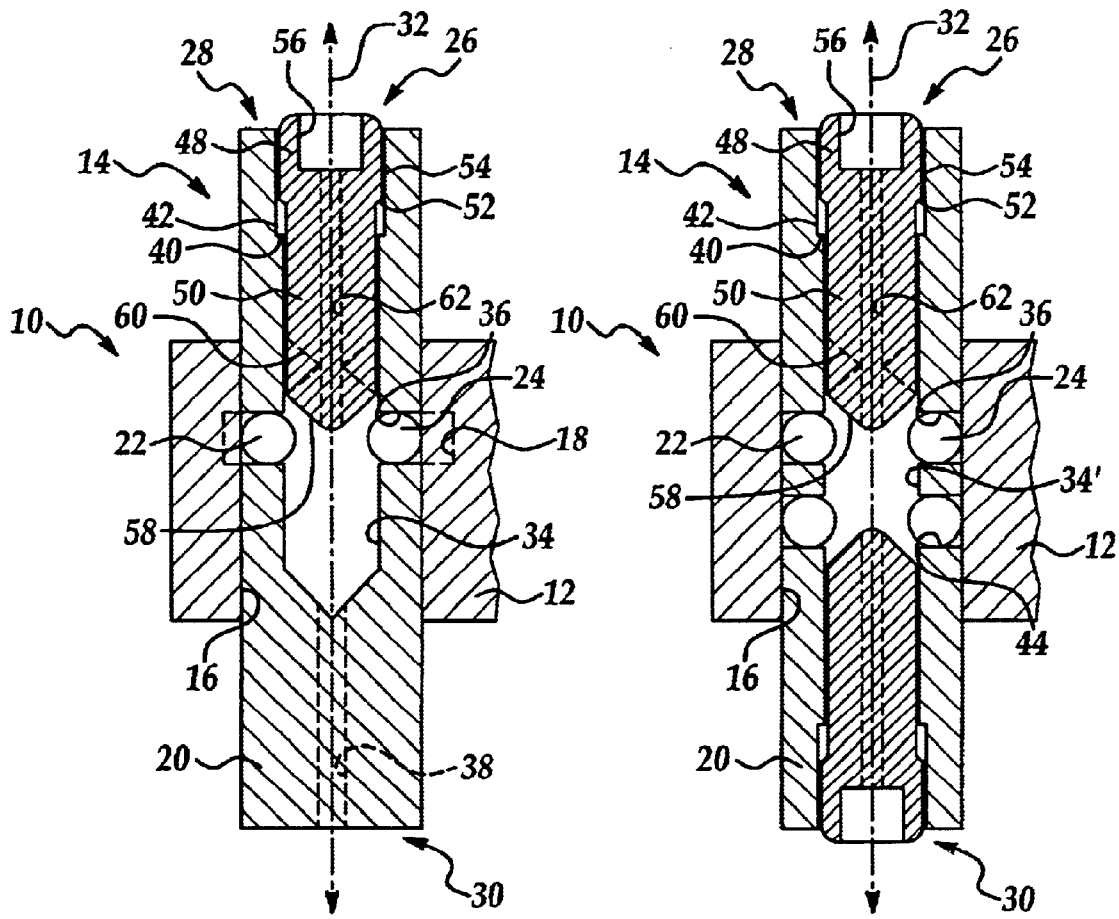
*Figure 1*    *Figure 2*
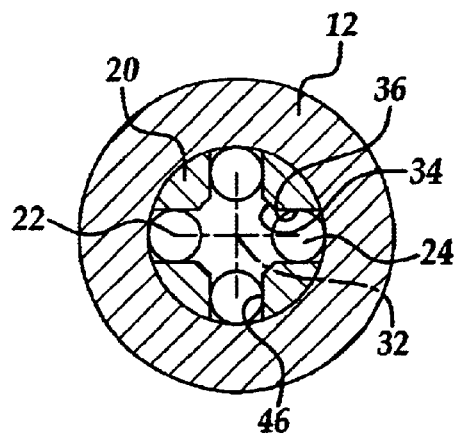
*Figure 3*

CO-AXIAL KINGPIN LOCK MECHANISM

BACKGROUND OF THE INVENTION

1. Field of the Invention

This invention relates to steer axles and, in particular, to a mechanism for retaining the kingpin within a kingpin bore of the steer axle.

2. Disclosure of the Related Art

A conventional steer axle assembly includes a steer axle beam that defines a kingpin bore at either longitudinal end. A kingpin is received within each kingpin bore and supports a conventional steering knuckle which in turn supports a steerable wheel. Conventional kingpins, as illustrated in U.S. Pat. No. 5,709,399 issued to Smith, are secured against rotation within the kingpin bore using one or move draw keys that are inserted through bores drilled through the axle beam.

The use of draw keys to prevent movement of kingpins in steer axles has several drawbacks. First, the use of draw keys requires relatively expensive machining (off-axis drilling and tapping) and manual handling of the steer axle beam. Second, draw keys are a source of contamination in the normal vehicle environment. Finally, draw keys become corroded relatively quickly and are therefore difficult to disassemble in the filed and are subject to failure. Some steer axles have overcome one or more of these drawbacks by incorporating tapered or interference type kingpins rather than drawn keys. Tapered and interference type kingpins are difficult to service in the field, however.

The inventors herein have recognized that there is a need for a steer axle kingpin assembly that will minimize or eliminate one or more of the above-mentioned deficiencies.

SUMMARY OF THE INVENTION

The present invention provides a steer axle kingpin assembly for retaining the kingpin within a kingpin bore of the steer axle.

A steer axle kingpin assembly in accordance with the present invention includes a body portion configured to be received within a kingpin bore of a steer axle. The body portion is disposed about a longitudinal axis and has a first axial bore and a first radial bore in communication with the first axial bore. The assembly also includes a first bearing member disposed within the first radial bore. The bearing member may comprise a ball bearing. The assembly finally includes a first lock pin disposed with the first axial bore that urges the first bearing member radially outwardly and into engagement with a surface of the kingpin bore.

A steer axle kingpin assembly in accordance with the present invention represents a significant improvement as compared to conventional kingpin assemblies. In particular, the inventive steer axle kingpin assembly reduces the overall cost of the steer axle by eliminating expensive machining of the steer axle beam and enabling automated manufacture of the steer axle beam. A steer axle incorporating the inventive: kingpin assembly is also subject to less contamination than conventional steer axles. Finally, the inventive kingpin, assembly is easier to repair in the field than conventional kingpin assemblies.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a cross-sectional view of a portion of a steer axle assembly incorporating a kingpin assembly in accordance with one embodiment of the present invention.

FIG. 2 is a cross-sectional view of a portion of a steer axle assembly incorporating a kingpin assembly in accordance with a second embodiment of the present invention.

FIG. 3 is a cross-sectional view of a portion of a steer axle assembly incorporating a kingpin assembly in accordance with a third embodiment of the present invention.

DETAILED DESCRIPTION OF THE PREFERREED EMBODIMENTS

Referring now to the drawings wherein like reference numerals are used to identify identical components in the various views, FIG. 1 illustrates a portion of a steer axle assembly 10 in accordance with the present invention. Axle assembly 10 is provided to support steerable wheels on either end for directional control of a vehicle. Assembly 10 may include a steer axle beam 12 and a kingpin assembly 14 in accordance with one embodiment of the present invention.

Axle beam 12 is provided to support a vehicle frame (not shown) on steerable wheels supported on either end of beam 12. Beam 12 is conventional in the art and may be forged or stamped from conventional metals and metal alloys. Beam 12 extends along a longitudinal axis that is transverse to the direction of vehicle travel. Beam 12 defines a kingpin bore 16 (only one of which is shown in the illustrated embodiment) proximate each axial end of beam 12. Bore 16 extends through beam 12 and may be a plain bore. Alternatively, the diameter of bore 16 may vary to define a groove 18. (illustrated in dotted line) for a purpose described hereinbelow.

Kingpin assembly 14 is provided to mount a steering knuckle (not shown). The steering knuckle will typically include a yoke having arms coupled to each longitudinal end of kingpin assembly 14 on bushings (not shown) to allow the steering knuckle to rotate relative to kingpin assembly 14. Assembly 14 may include a body portion 20, bearing members 22, 24, and a lock pin 26.

Body portion 20 supports the steering knuckle (not shown) on bushings (not shown) disposed at each longitudinal end 28, 30. Portion 20 is disposed about a longitudinal axis 32 and is sized relative to kingpin bore 16, extending through beam 12. Portion 20 may be made from conventional metals and metal alloys. Portion 20 defines an axial bore 34 and at least one radial bore 36. Portion 20 may also define a lubrication passage 38 (shown in dotted line).

Axial bore 34 is configured to receive lock pin 26. Axial bore 34 is disposed about axis 32 and extends from one longitudinal end 28 of body portion 20. Bore 34 may be closed at one end as illustrated in FIG. 1. Referring to FIG. 2, however, an axial bore 34' may alternatively extend from one end 28 of portion 20 to an opposite end 30 of portion 20. The diameter of bore 34 may vary to define a shoulder 40 against which the head of lock pin 26 may rest. Bore 34 may also define a plurality of threads 42 at one longitudinal end 28 (or both longitudinal ends 28, 30 in the case of the through bore 34' illustrated in FIG. 2) to engage lock pin(s) 26.

Radial bore 36 is provided to receive bearing members 22, 24. Radial bore 36 communicates with axial bore 34 and may extend transverse to axial bore 34 and axis 32. Radial bore 36 may extend diametrically across body portion 20. As illustrated in FIGS. 2 and 3, body portion 20 may define additional radial bores 44, 46 in communication with radial bore 34. As illustrated in FIG. 2, radial bores 36, 44 may lie in different planes extending perpendicular to axis 32. Alternatively, or in addition, radial bores 36, 46 may lie in the same plane extending perpendicular to axis 32 as illustrated in FIG. 3. It should also be understood that the radial bores 34, 44, and/or 46 and the bearing members 22, 24 disposed in bores 34, 44, and/or 46 do not need to be located symmetrically about axis 32.

Lubrication passage 38 is provided to allow lubricant to pass through body portion 20 to a bushing (not shown) disposed about end 30 of portion 20. Passage 38 may extend axially from one end of bore 34 to end 30 of body portion 20.

Bearing members 22, 24 are provided to secure the position of body portion 20 within kingpin bore 16 of axle beam 12. Members 22, 24 are conventional in the art, and may comprise ball bearings previously rejected for another use because of manufacturing imperfections. It should be understood, however, that a variety of structural elements could be used as bearing members provided that such elements are capable of being urged outwardly from radial bore and into engagement with the surface of bore 16 (or into groove 18). Bearing members 22, 24 are disposed within radial bore 36 of body portion 20. As illustrated in FIGS. 1–3, multiple bearing members 22, 24 may be disposed in any radial bore 36, 44, 46. Alternatively, however, a single bearing member may be disposed within any given radial bore. It should also be understood that, although the illustrated embodiments show a single bearing member disposed in each radial bore 36, 44, 46 between axial bore 34 (or 34'), and the kingpin bore 16, multiple bearing members 22, 24 could be disposed between the two bores 34 (or 34'), 16 in any given radial bore 36, 44, 46. It should further be understood that the number of bearing members 22, 24 in the radial bores 36, 44, 46 do not need to be equal along axis 32 or within any given plane extending perpendicular to axis 32.

Lock pin 26 is provided to urge bearing members 22, 24 radially outwardly into engagement with the surface of kingpin bore 16 (or into groove 18 defined in kingpin bore 16). Lock pin 26 may be made from conventional metals and metal alloys. Lock pin 26 may be disposed about axis 32 and may include a head 48 and a shank 50. In FIG. 1, a single lock pin 26 is used. Referring to FIG. 2, however, a second identical lock pin 26 may be disposed at an opposite longitudinal end 30 of body portion 20 where axial bore 34, comprises a through bore.

Head 48 is used to position and secure lock pin 26 within axial bore 34. Head 48 and shank 50 together define a shoulder 52 configured to engage shoulder 40 and prevent further entry of lock pin 26 into axial bore 34. Head 48 defines a plurality of threads 54 on a radially outer surface configured to engage corresponding threads 42 in axial bore 34. Head 48 also defines a socket 56 configured to receive a tool used to rotate lock pin 26.

Shank 48 extends into axial bore 34 and urges bearing members 22, 24 outward from radial bores 36, 44, 46. Shank 48 may include a tapered end 58 at that acts as a cam against bearing members 22, 24. The tapered end 58 forms one actuation surface. As illustrated by dotted lines in FIGS. 1 and 2, however, shank 48 may define additional actuation surfaces 60. Shank 48 further may further define a lubrication passage 62 extending from socket 56 in head 46 to tapered end 58. Passage 62 (along with passage 38 in body portion 20) provides a means for delivering lubricant to the bushings (not shown) at either longitudinal end of body portion 20. This arrangement reduces or eliminates differential pressure caused by up and down movement of the vehicle and minimizes contaminant ingress, thereby permitting extended maintenance intervals for the kingpin joint.

A steer axle kingpin assembly in accordance with the present invention represents significant improvements as compared to conventional kingpin assemblies. The inventive assembly reduces the overall cost of the steer axle by eliminating expensive machining of the steer axle beam and enabling automated manufacture of the steer axle beam. A steer axle incorporating the inventive kingpin assembly is also subject to less contamination than conventional steer axles and is easier to repair in the field.

While the invention has been particularly shown and described with reference to the preferred embodiments thereof, it is well understood by those skilled in the art that various changes and modification can be made in the invention without departing from the spirit and scope of the invention.

I claim:

1. A steer axle kingpin assembly, comprising:
   a body portion configured to be received within a kingpin bore of a steer axle, said body portion disposed about a longitudinal axis and having a first axial bore and a first radial bore in communication with said first axial bore;
   a first bearing member disposed within said first radial bore; and,
   a first lock pin disposed within said first axial bore and urging said first bearing member radially outwardly and into engagement with a surface of said kingpin bore when said body portion is received within said kingpin bore of said steer axle.

2. The steer axle kingpin assembly of claim 1 wherein said first axial bore is closed at one end.

3. The steer axle kingpin assembly of claim 1 wherein said first axial bore extends from one longitudinal end of said body portion to an opposite longitudinal end of said body portion.

4. The steer axle kingpin assembly of claim 1, further comprising a second lock pin disposed at a longitudinally opposite end of said body portion relative to said first lock pin.

5. The steer axle kingpin assembly of claim 1, further comprising a second bearing member disposed within said first radial bore.

6. The steer axle kingpin assembly of claim 1 wherein said body portion has a second radial bore in communication with said first axial bore and a second bearing member disposed within said second radial bore.

7. The steer axle kingpin assembly of claim 6 wherein said first and second radial bores are located in the same plane extending perpendicular to said axis.

8. The steer axle kingpin assembly of claim 6 wherein said first and second radial bores are located in different planes extending perpendicular to said axis.

9. The steer axle kingpin assembly of claim 1 wherein said first radial bore extends diametrically across said body portion.

10. The steer axle kingpin assembly of claim 1 wherein said first lock pin includes a tapered end.

11. The steer axle kingpin assembly of claim 1 wherein said first lock pin includes a lubrication passage extending therethrough.

12. The steer axle kingpin assembly of claim 1 wherein said first lock pin includes first and second actuation surfaces.

13. A steer axle assembly, comprising:
a steer axle beam defining a kingpin bore at one end;
a kingpin assembly disposed within said kingpin bore, said kingpin assembly including:
   a body portion configured to be received within said kingpin bore, said body portion disposed about a longitudinal axis and having a first axial bore and a first radial bore in communication with said first axial bore;
   a first bearing member disposed within said first radial bore; and,
   a first lock pin disposed within said first axial bore and urging said first bearing member radially outwardly and into engagement with a surface of said kingpin bore.

14. The steer axle assembly of claim 13 wherein said kingpin bore defines a circumferential groove configured to receive said first bearing member.

15. The steer axle assembly of claim 13 wherein said first axial bore is closed at one end.

16. The steer axle assembly of claim 13, further comprising a second lock pin disposed at a longitudinally opposite end of said body portion relative to said first lock pin.

17. The steer axle assembly of claim 13 wherein said body portion has a second radial bore in communication with said first axial bore and a second bearing member disposed within said second radial bore.

18. The steer axle assembly of claim 17 wherein said first and second radial bores are located in the same plane extending perpendicular to said axis.

19. The steer axle assembly of claim 17 wherein said first and second radial bores are located in different planes extending perpendicular to said axis.

20. The steer axle assembly of claim 13 wherein said first lock pin includes a lubrication passage extending therethrough.

* * * * *